United States Patent [19]
O'Brien

[11] Patent Number: 5,484,579
[45] Date of Patent: Jan. 16, 1996

[54] HYDROMETALLURICAL RECOVERY OF COPPER AND ZINC FROM COMPLEX SULFIDE ORES

[75] Inventor: Robert N. O'Brien, Victoria, Canada

[73] Assignee: R & O Mining Processing Ltd., Vancouver, Canada

[21] Appl. No.: 308,570

[22] Filed: Sep. 19, 1994

Related U.S. Application Data

[63] Continuation of Ser. No. 9,844, Jan. 27, 1993, abandoned.

[51] Int. Cl.$^6$ ............................. C22B 15/00; C22B 19/00
[52] U.S. Cl. ................................ 423/36; 423/41; 423/106
[58] Field of Search ................................ 423/36, 27, 41, 423/106, 23

[56] References Cited

U.S. PATENT DOCUMENTS

| | | | |
|---|---|---|---|
| 3,888,748 | 6/1975 | Brennecke | 423/109 |
| 3,910,636 | 10/1975 | Hard | 423/27 |
| 3,912,330 | 10/1975 | Carnahan et al. | 423/34 |
| 3,933,478 | 1/1976 | Moore | 423/27 |
| 4,132,758 | 1/1979 | Frankiewicz et al. | 423/27 |
| 4,647,307 | 3/1987 | Raudsepp et al. | 423/27 |

FOREIGN PATENT DOCUMENTS

| | | |
|---|---|---|
| 2070315 | 12/1993 | Canada. |
| 0113649 | 7/1984 | European Pat. Off.. |
| 0119685 | 9/1984 | European Pat. Off.. |
| 0166710 | 1/1986 | European Pat. Off.. |
| 0272060 | 6/1988 | European Pat. Off.. |
| 2190928 | 6/1973 | France. |
| WO92/15713 | 9/1992 | WIPO. |
| PCT/CA94/00034 | 1/1994 | WIPO. |

OTHER PUBLICATIONS

Chalcopyrite, Its Chemistry and Metallurgy, Habashi, F., 1978, no month, pp. 82–85 and 93.
Principles of Extractive Metallurgy, vol. 2 Hydrometallurgy, Habashi, F., no month, 1970, pp. 103–104.
K. Tkacova et al., *Stuctural and Temperature Sensitivity of Leaching of Chalcopyrite with Iron (III) Sulphate*, Hydrometallurgy, vol. 21, pp. 103–112 (1988) no month.
J. Avraamides et al., *Cuprous Hydrometallurgy Part VI. Activation of Chalcopyrite by Reduction with Copper and Solutions of Copper (I) Salts*, Hydrometallurgy, vol. 5, pp.

(List continued on next page.)

*Primary Examiner*—Steven Bos
*Attorney, Agent, or Firm*—Bell, Seltzer, Park & Gibson

[57] ABSTRACT

A continuous hydrometallurgical process for conversion of ore derived copper and zinc sulfides into recoverable water soluble sulfates is provided. The process comprises:

i) contacting the ore derived copper and zinc sulfides with sulfuric acid and with nitric acid to form a reaction mixture in an acidic solution, ii) maintaining the reaction mixture at a temperature in the range of 110° C. to 170° C. while continuously mixing the reaction mixture, iii) adding sufficient sulfuric acid and nitric acid to the reaction mixture to form a light precipitate and a dark precipitate in the reaction mixture, the light precipitate comprising water soluble sulfate salts of copper sulfate, zinc sulfate and iron sulfate, and the dark precipitate being water insoluble and comprising mainly elemental sulfur and gangue, iv) introducing a source of oxygen to the reaction mixture to promote oxidation in the presence of the nitric acid, of the sulfides to sulfates and to oxidize gaseous $NO_x$ reaction products to regenerate nitric acid for the reaction mixture, v) removing the light and dark precipitates and any entrained acidic solution from the reaction mixture, vi) separating the light and dark precipitate from the acidic solution in preparation for treatment of the light precipitate for recovery of copper sulfate and zinc sulfate from the light precipitate, and vii) recycling the acidic solution to the reaction mixture.

9 Claims, 1 Drawing Sheet

OTHER PUBLICATIONS

325–336 (1980), no month.

G. Van Weert et al. dissertation entitled, *Chloride and Nitrate Systems in Hydrometallurgy Applications and Opportunities,* 1989, no month.

W. Barzyk et al., *Electrochemical Studies of Stoichiometry Changes of Copper Sulfide ($Cu_{2-x}S$) Grains in Acid Cupric Sulfate Solutions,* (Inst. Catal. Surfac. Chem., Pol. Acad. Sci., 30–239 Krakow, Pol.), Mater. Sci. Forum no month, 1988, 25–26 (Chem. Interfaces), 565–8 (Eng.), Abstract.

R. I. Agladze et al., *Processing Sulfide Ores Containing Nonferrous Metals,* Otkrytiya, Izobret., Prom. Obraztsy, Tovarnye Znaki no month, 1981 (21), 140, Abstract.

R. W. Adams et al., *Direct Leaching of Zinc Concentrates at Atmospheric Pressure,* Lead–Zinc '90, ed. Mackey & Prengaman, TMS, 420 Commonwealth Drive, Warrendale, Pa. 15086, 1990, no month.

D. S. Flett, *The Role of Hydrometallurgy in Extractive Metallurgy, Chemistry and Industry,* Jun. 20, 1981, pp. 427–431.

*The Condensed Chemical Dictionary,* Tenth Edition, no month, (1981) pp. 278, 489, 873 and 1112.

HYDROMETALLURICAL RECOVERY OF COPPER AND ZINC FROM COMPLEX SULFIDE ORES

This application is a continuation of application Ser. No. 08/009,844, filed Jan. 27, 1993, now abandoned.

FIELD OF THE INVENTION

This invention relates to a hydrometallurgical process for conversion of copper and zinc sulfides in various copper containing ores such as chalcopyrite, into water soluble sulfates which can be subsequently readily recovered.

BACKGROUND OF THE INVENTION

There is a significant push to develop commercial forms of a hydrometallurgical process to recover various types of metal from ore bodies. The significant advantage of a hydrometallurgical process over the standard smelting process, is the significant reduction in sulfur dioxide emissions. Although the chemistry might appear to be relatively direct in extracting, for example, copper and zinc from sulfide ores, all known commercial approaches in this regard have either failed or are not economically viable. It is known that several of these hydrometallurgical processes for leaching copper, zinc and the like from either ore concentrate or a rich ore involve the use of sulfuric acid and/or nitric acid and/or nitrate salts.

U.S. Pat. No. 3,888,748 discloses a metal recovery process whereby copper may be recovered from sulfide ore concentrates containing minerals such as chalcopyrite ($CuFeS_2$). The copper is recovered by contacting the ore concentrate with a dilute aqueous solution of nitric acid and sulfuric acid to give a leachate containing in solution of copper salts and iron salts and a residue. The leachate is subjected to further processing in which copper is recovered and iron is precipitated as jarosite. Jarosite has no value and can complicate the recovery process. The nitrate ions and its derivatives must be substantially removed from the leachate to facilitate an electrowinning of copper or zinc from the solution.

In U.S. Pat. No. 3,910,636 a process is disclosed for in-situ mining. Holes are drilled into an ore body and the holes are filled with an acid leaching solution containing nitrate ions at a pH range of 0.2 to about 2.0. However, the solution becomes diluted and hence, the process is relatively slow in leaching copper from the ore. In addition, the process cannot normally be used in limestone formations.

Another in-situ chemical mining process is disclosed in U.S. Pat. No. 3,912,330 which is specifically directed at dealing with copper porphyry ores. Catalytic amounts of nitrate ion are added to an oxygenated sulphuric acid leach medium to improve the rate of copper extraction from copper sulfide ores. The nitrate concentrations may range from 0.05 to 0.50% and the acid media is oxygenated at oxygen pressures from 25 psi to 200 psi. Jarosite is said to be precipitated and the process is acknowledged to be unsuitable for surface heap leaching.

U.S. Pat. No. 4,647,307 teaches that complex copper ores can be treated with oxidizing acid media. Arsenical ores can be processed especially well with this system.

Published literature in the field includes a Ph.D. dissertation (G. Van Weert, Ph.D. Dissertation, De Technische Universiteit, Delft, Holland, 1989) which contains an Appendix giving a summary of treatments for complex ores and concentrates containing chalcopyrite. Avramides et al (Hydrometallurgy, 5, 325–36 (1980)) describe a process in which the chalcopyrite leaching process consists of leaching with acetonitrile solutions of cupric and cuprous ions. Kiknadze et al (Izv. Akad. Nauk Gruz. SSR, Set. Khim., 6 363–6 (1980)) describe a ferric ion leach of chalcopyrite where the ferric ion is regenerated with chlorine. Another ferric ion leach is described by Tkacova and Balaz (Hydrometallurgy, 21 103–12 (1988)) purports to increase the surface area of chalcopyrite but mentions also that the sulfur on the surface retards the dissolution of the chalcopyrite. Pomanianowski et al. (Electrocatal., Mater. Symp. Electrochem. Sect. Pol. Chem. Soc., 9th meeting date 1987, 241–7, Edited by Pawel Nowak, Pol. Chem. Soc.: Warsaw Pol.) found that deposition of minor amounts of silver on the surface of chalcopyrite catalysed the rate of dissolution by electrochemical means.

The above processes however are inadequate from one or more of the following perspectives:

i) the processing cost is uneconomical relative to the value of the metals recovered, ii) inoperable in a commercial scale, iii) polluting off gases, iv) inefficient recovery of the valuable metal(s), v) off gases cannot be treated for recycle and re-use in the process, vi) processing conditions require the use of pressurized reactors to obtain conversions of copper and zinc sulfides to corresponding sulfate salts.

The process according to this invention overcomes several of the above problems in providing a process which does not have to operate under pressurized conditions. Because of the use of high concentrations of sulfuric acid in the presence of oxidizing nitric acid and oxygen gas, the desired metals are recovered as water soluble salts precipitated in the acidic solution of the reaction mixture which is operated at temperatures in the range of 110° C. to 170° C. at which temperature and high acidity the water soluble metal salts are less soluble.

SUMMARY OF THE INVENTION

According to an aspect of the invention a continuous hydrometallurgical process is provided for conversion in the presence of nitric acid of ore derived copper and zinc sulfides into recoverable water soluble sulfates while minimizing emissions of nitrogen gas and $N_2O$ gas, The process comprises:

i) contacting the ore concentrate derived copper and zinc sulfides with sulfuric acid and with nitric acid to form a reaction mixture in an acidic solution, ii) maintaining the reaction mixture at a temperature in the range of 110° C. to 170° C. while continuously mixing the reaction mixture, iii) adding sufficient sulfuric acid and nitric acid to the reaction mixture to form a light coloured precipitate and a dark coloured precipitate in the reaction mixture, the light precipitate comprising water soluble sulfate salts of copper sulfate and zinc sulfate and the dark precipitate being water insoluble and comprising sulfur and gangue, iv) introducing a source of oxygen to the reaction mixture to promote oxidation in the presence of the nitric acid, of the sulfides to sulfates and to oxidize gaseous $NO_x$ reaction products to regenerate nitric acid for use in the reaction mixture, v) removing the light and dark precipitates and any entrained acidic solution from the reaction mixture, vi) separating the light and dark precipitate from the acidic solution in preparation for treatment of the light precipitate for recovery of copper sulfate and zinc sulfate from the light precipitate, and vii) recycling the acidic solution to the reaction mixture.

According to another aspect of the invention, the copper and zinc sulfides are provided in a finely divided ore concentrate, particularly an ore concentrate derived from an ore body of chalcopyrite, sphalerite and other sulfide or sulfo salt minerals. The copper sulfide present in the sulfide ore ($CuFeS_2$) is converted by the process to partially dehydrated white copper sulfate, which in the acid solution, precipitates and thereby forms part of the light coloured precipitate.

According to another aspect of the invention, the amount of sulfuric acid maintained in the reaction mixture is based on a volume concentration of concentrated sulfuric acid to volume of reaction mixture in the range of 40% to 65% volume per volume. The concentration of the nitric acid is at least 1.5 moles of nitric acid per mole of copper sulfide in the ore concentrate.

DETAILED DESCRIPTIONS OF THE PREFERRED EMBODIMENTS

Figure 1:
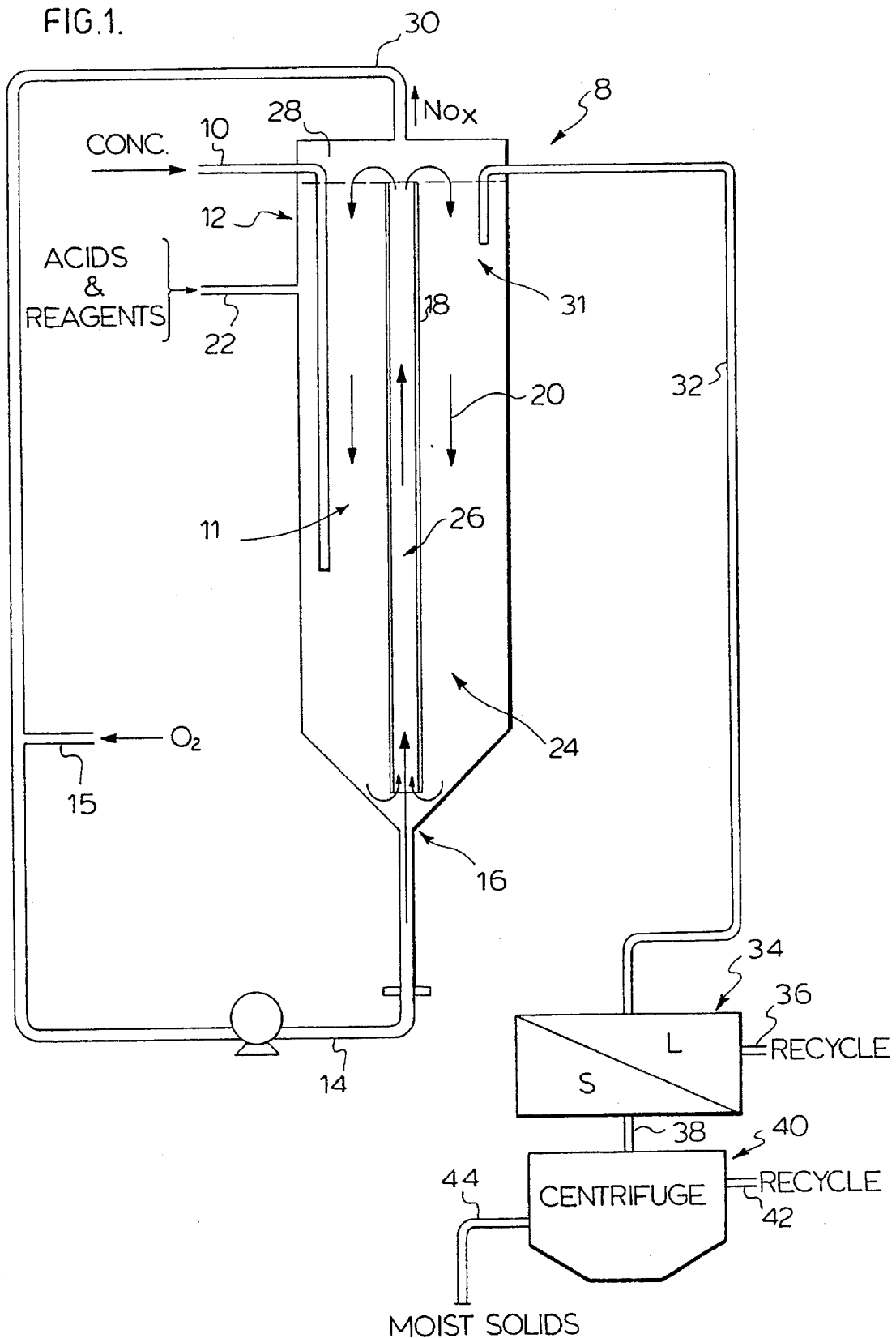
FIG. 1 is a schematic of a flow diagram in which the process of this invention is carried out.

The process of this invention is particularly suited in the treatment of metal ores which contain copper sulfides and/or zinc sulfides. The ore may be either in a finely divided concentrate form, a finely divided rich ore or a combination of the two. Examples of such mineral bearing ores commonly include chalcopyrite, chalcocite, bornite, tetrahedrite, sphalerite, galena, molybendite, pyrite, pyrrhotite and arsenopyrite. The ore is in particle form and is preferably ground such that 75% of the finest particles pass 275 mesh. This ensures a finely divided material on which the reagents used in the process of this invention react. Most copper and zinc ore sources normally include chalcopyrite, sphalerite, bornite, pyrite, galena and mixtures thereof. In a preferred aspect of the invention the objective is to recover the copper and the zinc where such recovery may be firstly in the form of a water soluble precipitate containing zinc and copper in the sulfate form and then by further processing, the zinc and copper ions in solution may be refined to provide copper and zinc in separate electrowinning processes.

It is also appreciated that such ores may include precious metals such as rhodium, palladium, platinum, silver and gold. Commonally such constituents are in trace amounts and may not warrant recovery. It has been found that these precious metals do not present a problem with respect to the processing conditions. Similarly, small amounts of Pb, Cd, As and Sb are commonly found in such ores. It has also been found that the presence of iron in the ore also does not present any processing problems and furthermore if desired, iron could also be recovered from the reaction products of this conversion process.

Although the chemistry in this conversion process involving the use of very high concentrations of sulfuric acid and the necessary amount of nitric acid is not fully understood, it is thought that the reaction could be generally demonstrated as follows:

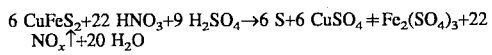

It has been found that conversion of the emitted $NO_x$ gases to nitric acid can be effected by the introduction of an oxygen containing gas to the reaction system. In this event, the general reaction scheme is thought to be:

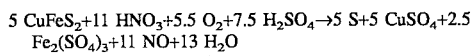

Correspondingly the reaction involving zinc sulfide is thought to be:

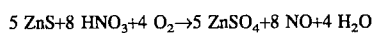

It is understood that these reaction schemes are of a general nature and the stoichiometry of the scheme may vary from that depicted. The following examples however demonstrate the formation of the copper and iron sulfates which are part of the precipitate and that primarily NO and $NO_2$ gases are generated, which in the presence of oxygen are converted back to nitric acid and nitrous acid ($HNO_3$ and $HNO_2$). There are minimal emissions of the environmentally undesirable $N_2O$ gases.

The role that the nitric acid plays in this conversion process is not fully understood. It is thought that the nitric acid may in some way catalyze the conversion of the sulfur and iron moieties to their higher valency states. It has been found that in accordance with this invention, the amount of off gases which can be converted back to or recycled as nitric acid is quite high and normally exceeds 80% and may be as high as 90%. The remaining nitrogen based off gases include nitrogen and nitrous oxide which may make up the remaining 10 to 20%. Of that mixture, nitrous oxide is the lower in concentration, normally in the range of less than 5% of total nitrogen containing gases. As required for environmental purposes, the off gases containing the nitrous oxide may be treated in the necessary manner before release to atmosphere.

It has been found that the amount of nitric acid used in the conversion process can vary considerably. It has been found that excessive amounts of nitric acid may be used with little, if any impact on the overall efficiency of the process. There is however required a minimum amount of nitric acid to ensure this conversion of the zinc and copper sulfides to sulfates which result in the form of the light precipitates. According to a preferred embodiment of the invention, the nitric acid concentration should be at least about 0.5 mole of nitric acid per mole of copper sulfide in the incoming concentrate or ore. Based on investigations with respect to the preferred embodiments, it has been found that a concentration of nitric acid in excess of 3 mole per mole of copper sulfide does not appear to enhance in any way the conversion of the sulfides to the sulfates. The preferred concentration for nitric acid is in the range of 0.5 to 1.5 mole of nitric acid per mole of copper sulfide. It has also been found that when the nitric acid is added to the reaction mixture it is preferable to add the nitric acid over time rather than an immediate introduction. The rate of addition may be based on the volume of reaction mixture. The rate of introduction of nitric acid may be in the range of 0.3% to 1% volume of nitric acid per minute based on the volume of reaction mixture and the time desired for the reaction.

The sulfuric acid is normally already in the reaction mixture and is maintained at a concentration at least in excess of 40% volume per volume of reaction mixture and upwardly to 65% volume per volume of reaction mixture. It has been found that the concentration of sulfuric acid being less than 40% volume per volume does not produce sufficient conversion of the sulfides and sulfates to produce the light precipitate and achieve the solid-liquid separation. Whereas, use of sulfuric acid in excess of 65% tends to create hazardous $NO_x$ fumes in the light precipitate when re-dissolved. The reaction mixture is maintained at about 10M. At this acid concentration, the water soluble sulfates of copper, iron and zinc are predominantly insoluble to form the precipitate in this acidic mixture. It is also understood that in the continuous reactor the nitric acid and the sulfuric acid are added essentially on a continuous basis or on an intermittent basis to maintain the desired concentrations of sulfuric acid in the reaction mixture and as well to maintain the molar relationship of the nitric acid to moles of incoming copper and zinc sulfides.

It has been found that with increasing sulfuric acid concentrations, the amount of the precipitate in the light form increases, and as well the dark form which contains not only sulfur but as well gangue. Furthermore, by increasing the sulfuric acid concentration it has been found that more of the iron is precipitated in the light precipitate and as well, more of the copper and zinc move into the white precipitate than remain in solution. Also, there is a slight increase by weight in the amount of iron, copper and zinc which moves over into the dark precipitate at the higher concentrations of sulfuric acid. Therefore, depending upon the process parameters, the concentration of sulfuric acid may be adjusted within the range of 40 to 65% volume per volume to achieve the optimum recovery of at least the copper and zinc in the light precipitate.

It has been found extremely beneficial to this invention that the light precipitate is water soluble whereas the dark precipitate is soluble in organic solvents. This permits the water extraction of the desired metal sulfates from the light precipitate without in any way extracting any meaningful amounts of impurities from the dark precipitate. Furthermore, it avoids the use of organic solvents in attempting to remove any of the dark precipitate before proceeding with the water extraction of the valuable metals from the light precipitate.

Although it is difficult to predict with varying acid concentration the moietic structure of the iron, copper and zinc materials in the precipitate, it is believed that with higher concentration of acid and/or at higher temperatures, the various salts tend to dehydrate. In their hydrated form, iron, copper and zinc may appear with or without entrapped $NO_3^-$ as:

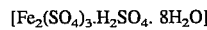
[$Fe_2(SO_4)_3 \cdot H_2SO_4 \cdot 8H_2O$]

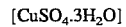
[$CuSO_4 \cdot 3H_2O$]

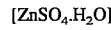
[$ZnSO_4 \cdot H_2O$]

At higher concentrations of acid and/or temperature, the salts tend to dehydrate to produce

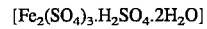
[$Fe_2(SO_4)_3 \cdot H_2SO_4 \cdot 2H_2O$]

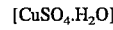
[$CuSO_4 \cdot H_2O$]

[$ZnSO_4$]

Hence, in a continuous reactor where the sulfuric acid concentration and the temperature may vary, the salts of the iron, copper and zinc may be hydrated and/or partially or totally dehydrated during processing as they remain in the light coloured precipitate. In any event, the dissolved forms of the copper, zinc and iron in the acid solution are eventually recycled in the process where equilibrium is eventually achieved for concentrations of these metals in sulfate form in the solution. Furthermore, with regeneration of the various nitrogen gases coming off the reaction and convened back to nitric acid and nitrous acid. The amount of nitric acid introduced may also move downwardly to compensate for the 10 to 20% of nitrogen gases which cannot be converted back to nitric acid.

It is preferred that the reaction is carried out at a temperature in the range of 110° C. up to the boiling point of the solution which is about 175° C. A preferred reaction temperature in the range of 120° C. to 170° C. and most preferred range of 110° C. to 150°.

It is appreciated that the process of this invention could be carried out in a batch reactor. However, with the volumes of ore or ore concentrate to be treated, it is preferred to have a continuous process. It is understood that a variety of known systems are available in which a continuous reactor may be provided in which the reaction of this invention may be carried out. A suggested reaction scheme for a single continuous reactor 8 is shown in FIG. 1. The feed which consists of the usual form of metal concentrate or metal rich ore, is introduced through line 10 into a lower region 11 of the continuous reactor 12 which in this embodiment is the common form of the known Pachucha type reactor. A source of oxygen which may be pure oxygen, oxygen enriched air or air is introduced through line 14 at inlet 15 and upwardly through the lower portion 16 of the reactor. The gases flow directly upwardly of the draft tube 18 to cause a circulation of the material within the reactor 12 in a direction of arrows 20. The necessary sulfuric acid, nitric acid and reagents are introduced through line 22 in accordance with the process parameters as already described. The gases mix with the acids and reagents to draw them into the circulating reacting mixture within the annular portion 24 of the tank and as well within the draft tube portion 26 of the tank. Any gases produced in the reaction which are not converted back to nitric and nitrous acid ($HNO_3$ and $HNO_2$) are removed from the upward portion 28 of the reactor and removed for treatment and recycle through line 30. As already discussed, the off gases as required can be treated to render them environmentally safe for exhaust used in other related processes or treated with water and oxygen to convert remaining $NO_x$ gases to nitric acid and nitrous acid ($HNO_3$ and $HNO_2$). The oxygen is introduced at inlet 15 and the needed water is produced "in situ" of the reaction mixture in accordance with the aforementioned reaction scheme. Based on the mass flow rate of feed through line 10, correspondingly a solution containing the reactants is removed from below liquid level at region 31 through vented overflow line 32 for further processing. The solution removed in line 32 includes the formed precipitate. The precipitate in the acidic solution is transferred through line 32 to a solid liquid separator 34. The liquid separated from the light and dark precipitate is removed via line 36 and recycled to the reactor 12 normally through line 22. The solid which has most of the acid solution removed therefrom is transferred via line 38 to a centrifuge 40 or a filter press which removes the remainder of the acidic solution from the solid precipitate. The remaining acid solution is removed from the centrifuge via line 42 and recycled to the reactor 12 through line 22. The moist solids are removed from the centrifuge 40 through line 44 or may be dumped from the centrifuge depending upon the choice thereof. It is understood that when necessary, a series of the continuous reactors 8 may be set up in a cascade manner to treat the incoming concentrate to an extent which achieves the desired conversion of the sulfides into the insoluble copper and zinc sulfates. It is anticipated that in most applications, four reactors in series will be required. It should also be noted that with respect to reactor design, that the Pachucha reactor normally has a height to diameter ratio of about 10:1.

The precipitate in the form of the moist solids, contains both the light and dark forms, where the valuable metals to be recovered from the light precipitate can be recovered by leaching. A suggested technique for leaching the metals from the precipitate is by solvent extraction in accordance with a default procedure. The default procedure involves the use of solvent extraction reagents. Copper can be extracted from a solution of pH around 2.5 using LIX 64N (a Heinkel reagent). The reagent is commonly used in heap leaching of copper. Because the solutions are very acid, the solutions are partially neutralized with limestone and filtered to remove gypsum and iron compounds (geothite or jarosite) before extraction with solvent. The extraction solvent is then stripped and cut with spent electrolyte which is strongly acid (typically 200 g) $H_2SO_4$ and 35–40 g/L copper from the electrowinning cells before returning to the electrowinning cells to recover copper. The raffinate from the solvent extraction step contains residual copper, which can be cemented out with zinc dust. The raffinate should be neutralized still further, to pH 4 to 5, before zinc extraction. Again, gypsum and iron oxide are filtered off before extraction. The zinc reagent used in the solvent extraction is Di-2 Ethyl Hexyl Phosphoric Acid (D2EHPA), and succeeds in transferring zinc from this solution through the organic reagent into a zinc electrowinning solution to recover zinc. Other suitable reagents include (Cyanex 302, made by American Cyanamid).

With the preferred embodiment of the invention as exemplified with respect to the use of the Pachucha reactor, it is apparent that a reaction mixture is established within the tank 12 primarily in regions 24 and 26. Sufficient acid and oxygen reagents and other processing agents are added to the reactor either as needed or on a continuous basis to ensure that the desired optimum amount of light precipitate is continually produced and removed through line 32. It is appreciated that the solutions in which the copper and zinc are recovered are further processed by electrowinning to refine the copper and zinc to the desired purity. By proper extraction of the copper and zinc from the precipitate, a minimum amount of iron is present in the respective solutions so that iron does not interfere with the electrowinning processes. Furthermore, in the extraction, the nitric acid remaining in the precipitate is minimized so as to have little if any effect on the electrowinning processes. Any copper in the zinc electrowinning stream will be cemented out with Zn dust.

Preferred embodiments of the invention are exemplified in accordance with the following Examples.

EXAMPLE 1

Experimental Details

The Reactions have been run at sulfuric acid concentrations of 45%, 50%, 65% and 75% (by volume). All reactions have used 10 g of concentrate, 65 mL of sulfuric acid solution, and 12 mL of nitric acid (conc.). The nitric acid was added over 20 minutes to the stirring reaction mixture which was held at 120° C. to 130° C. for one hour. The reaction was continually flushed with oxygen and the gaseous products absorbed or trapped over aqueous sodium hydroxide solution. After one hour the reaction was further flushed for 30 minutes and the cooled reaction products weighed and vacuum filtered. The light coloured to white precipitate was dissolved in water. The residual black to dark precipitate was extracted with carbon disulfide. The resulting dark gangue, the solution of white precipitate and the original filtrate was analysed by atomic absorption spectroscopy. Titration of the aqueous sodium hydroxide solution gave a measure of the nitric acid recovered as nitrate or nitrite.

Results

The sodium hydroxide solution indicates that a large amount of nitric acid nitrate is not appearing in the gas stream under the above conditions. The 75% sulfuric acid filtrate bubbles off large quantities of brown gas upon dilution with water.

The nitric acid was added over extended periods. The longer the reaction times at lower temperatures results in more use of the oxygen present so that less nitric acid is required.

Analytical results for two experiments are set out in Table II. The results for the solution, white ppt. and gangue approximate by weight, approximately 100%. The results indicate that better extraction of copper to the white precipitate is achieved by the 50% sulfuric acid reaction than the 65% sulfuric acid solution. This agrees with the weights of gangue reported in Table I where there is a trend of increasing gangue weight with increasing sulfuric acid strength.

The impact of the concentration of sulfuric acid on the amount of precipitate in its light and dark forms is demonstrated in the following Table III.

TABLE I

| | Weights of Reactants and Products | | | | | | |
|---|---|---|---|---|---|---|---|
| | Reactants | Products | Filtrate | | | Gangue | Sulfur |
| $H_2SO_4$ (v/v) | (Wt. g) | (Wt. g) | (Vol. mL) | (Wt. g) | Ppts. (Wt. g) | (Wt. g) | (Wt. g) |
| 45 | 120.7 | 114.8 | 44.5 | 64.5 | 46.6 | 0.707 | 1.47 |
| 50 | 124.6 | 117.1 | 38 | 57.7 | 49.2 | 0.798 | 1.52 |
| 65 | 130.4 | 125.6 | 49 | 75.9 | 43.5 | 1.151 | 2.01 |
| 75 | 136.3 | 131.9 | 45 | 72.9 | 49.8 | 1.78 | 1.81 |

TABLE II

Analytical Results*

| Sample | Material | Iron % | Copper % | Zinc % |
|---|---|---|---|---|
| 99-0 #1 | Concentrate | 29.4 | 26.8 | 10.7 |
| 99-0 #2 | Concentrate | 29.4 | 26.4 | 10.4 |
| 99-0 #3 | Concentrate | 29.6 | 26.5 | 10.1 |
| 99-0 avg | | 29.5 | 26.5 | 10.4 |
| 99-1 | 50% solution | 7.79 | 23.2 | 37.8 |
| 99-2 | white ppt. | 80.3 | 64.9 | 46.3 |
| 99-3 | gangue | 5.62 | 7.1 | 0 |
| | total | 93.8 | 95.2 | 84.1 |
| 102-1 | 65% solution | 0.87 | 10.72 | 0.83 |
| 102-2 | white ppt. | 87.45 | 71.32 | 96.15 |
| 102-3 | gangue | 8.01 | 11.02 | 3.46 |
| | total | 96.35 | 93.1 | 100.4 |

*Results for reaction products are calculated as percentage of total amount of metal expected in the concentrate sample.

TABLE III

Weights of Reactants and Products

| $H_2SO_4$ | Reactants | Products | Difference | Filtrate | | | Ppts. | Gangue | Sulfur |
|---|---|---|---|---|---|---|---|---|---|
| (v/v) | (Wt. g) | (Wt. g) | (Wt. g) | (Vol. mL) | (Wt. g) | Density | (Wt. g) | (Wt. g) | (Wt. g) |
| 25 | 107.67 | 104.93 | −2.74 | 70 | 97.2 | 1.39 | 5.67 | 0.598 | 1.68 |
| 35 | 113.79 | 112.33 | −1.46 | 55 | 77.92 | 1.42 | 31.55 | 0.416 | 1.49 |
| 45 | 120.7 | 114.8 | −5.9 | 44.5 | 64.5 | 1.45 | 46.6 | 0.707 | 1.47 |
| 50 | 124.6 | 117.1 | −7.5 | 38 | 57.7 | 1.52 | 49.2 | 0.798 | 1.52 |
| 65 | 130.4 | 125.6 | −4.8 | 49 | 75.9 | 1.55 | 43.5 | 1.151 | 2.01 |
| 75 | 136.3 | 131.9 | −4.4 | 45 | 72.9 | 1.62 | 49.8 | 1.78 | 1.81 |

EXAMPLE 2

The process of this invention was carried out at two different sulfuric acid concentrations with dilute solutions of nitric acid based on the following results. It is demonstrated that the amount of nitric acid required in the reaction mixture can be reduced providing there is presence of oxygen in the reaction mixture. Reactions were carried out using 40% and 50% sulfuric acid and in 6 mL and 3 mL of 70% nitric acid, respectively. The third reaction was run under oxygen and with 12 mL $HNO_3$ as usual but after one hour the oxygen was replaced with argon and the reaction vessel heated to reflux conditions of approximately 170° C. for 30 minutes. The fourth reaction was under argon for the entire time. After 30 minutes the temperature was raised to the reflux range of 175° to 180° C. for 30 minutes. In this way the effect of oxygen and nitric acid concentration was determined. The results of these tests are summarized in following Table IV.

From the results of the reactions with the reduced amount of nitric acid, it is apparent that conversion of the sulfides to sulfates is within an acceptable range to demonstrate thereby the ability to reduce the amount of nitric acid present in the reaction mixture while at the same time maintaining the presence of oxygen in the reaction mixture.

Although preferred embodiments of the invention are described herein in detail, it will be understood by those skilled in the art that variations may be made thereto without departing from the spirit of the invention or the scope of the appended claims.

The embodiments of the invention in which an exclusive property or privilege is claimed are defined as follows:

1. A continuous hydrometallurgical process for single stage conversion of copper sulfides or zinc sulfides from ores containing copper sulfides, zinc sulfides, or both, and that are contained in finely divided materials into recoverable precipitates while minimizing emissions of nitrogen gas and $N_2O$, the process comprising:

contacting finely divided materials selected from the group consisting of an ore, a concentrate, and a mixture of an ore and a concentrate, and in which the ore or concentrate contains compositions selected from the group consisting of a copper sulfide, a zinc sulfide, and mixtures of copper sulfide and zinc sulfide, with sulfuric acid and nitric acid to form a reaction mixture of the materials and the sulfuric acid and nitric acid;

while concurrently mixing and maintaining the mixture at a temperature of between about 110° C. and 170° C.; and while introducing a source of oxygen to the mixture;

wherein the sulfuric acid is present in a volume amount of between about 40% and 65% based on the volume of the reaction mixture; and wherein the nitric acid is present in a ratio of between about 0.5 and 3.0 mole of nitric acid per mole of sulfide

TABLE IV

Weights of Reactants and Products

| $H_2SO_4$ | Reactants | Products | Difference | Filtrate | | | Ppts.* | Gangue** | Sulfur |
|---|---|---|---|---|---|---|---|---|---|
| (v/v) | (Wt. g) | (Wt. g) | (Wt. g) | (Vol. mL) | (Wt. g) | Density | (Wt. g) | (Wt. g) | (Wt. g) |
| 40 | 107.03 | 107.29 | 0.26 | 34 | 49.4 | 1.45 | ~50 | 0.924 | 1.651 |
| 40 | 104.47 | 106.59 | 2.12 | 41.5 | 58.7 | 1.41 | 45.6 | 1.862 | 1.707 |
| 40 | 118.33 | 115,01 | −3.32 | 64 | 92.5 | 1.44 | ~25 | 0.342 | 1.653 |
| 50 | 124.60 | 116.42 | −7.64 | 60 | 89.0 | 1.48 | 23.7 | −3.6 | 1.460 |

*Wet cake of vacuum filtered precipitate containing white precipitate and some or all of black precipitate.
**Carbon disulfide extracted black precipitate in the finely divided materials, the amounts of sulfuric acid and nitric acid present in the mixture being sufficient to form a light colored precipitate of water soluble sulfate salts of copper sulfate or zinc sulfate or both, and a dark colored precipitate of sulfur and gangue; and wherein the amount of introduced oxygen is sufficient to form regenerated nitric acid from the nitrogen-containing by-products.

2. A process of claim 1 wherein said finely divided material is derived from an ore body of chalcopyrite, sphalerite and other sulfide minerals.

3. A process of claim 2 wherein iron, as part of copper iron sulfide in said chalcopyrite, is converted in said reaction mixture to iron sulfate which in said acidic solution precipitates and thereby forms part of said light precipitates.

4. A process of claim 1 wherein sufficient sulfuric acid is added to provide a concentration of approximately 10M in said reaction mixture.

5. A process of claim 1 wherein said nitric acid when added to said reaction mixture is added at a rate per volume of reaction mixture in the range of 0.3% to 1% volume of nitric acid per minute.

6. A process of claim 1 wherein copper and zinc are recovered from said combined dark and light precipitate by water treatment to dissolve and remove from said precipitate, the soluble copper sulfate and zinc sulfate salts.

7. A process of claim 1 wherein said reaction mixture is maintained at a temperature in the range of 110° C. to 150° C.

8. A process of claim 1 wherein said nitrogen-containing by-products comprise NO and $NO_2$ which are oxidized by said oxygen in the presence of water to produce nitric acid as $HNO_3$.

9. A process according to claim 1 and further comprising the steps of:

removing the light colored and dark colored precipitates and any entrained acidic solution from the reaction mixture;

separating the light colored and dark colored precipitates from the reaction mixture in preparation for treatment of the light colored precipitate to recover copper sulfate and zinc sulfate from the light colored precipitate; and recycling the acidic solution separated from the reaction mixture.

* * * * *

UNITED STATES PATENT AND TRADEMARK OFFICE
CERTIFICATE OF CORRECTION

PATENT NO. : 5,484,579
DATED : January 16, 1996
INVENTOR(S) : Robert N. O'Brien

It is certified that error appears in the above-identified patent and that said Letters Patent is hereby corrected as shown below:

Column 2, line 5, "Set." should be -- Ser. --.

Column 4, line 4, "$\neq$" should be -- +3 --.

Column 4, line 30, "moleties" should be -- moieties --.

Column 4, line 40, before "treated" omit the period (.).

Column 5, line 30, after "may" omit the period (.).

Column 5, line 49, at the end of the line, omit "$\bar{\phantom{n}}$".

UNITED STATES PATENT AND TRADEMARK OFFICE
CERTIFICATE OF CORRECTION

PATENT NO. : 5,484,579
DATED : January 16, 1996
INVENTOR(S) : Robert N. O'Brien

It is certified that error appears in the above-indentified patent and that said Letters Patent is hereby corrected as shown below:

Column 6, line 7, "convened" should be -- converted --.

Column 9, Table IV, "115,01" should be -- 115.01 --.

Signed and Sealed this

Seventh Day of May, 1996

Attest:

BRUCE LEHMAN

Attesting Officer

Commissioner of Patents and Trademarks